United States Patent
Lee et al.

(10) Patent No.: US 8,905,203 B2
(45) Date of Patent: Dec. 9, 2014

(54) METHOD FOR PRODUCING BRAKE DISC, MOLD FOR PRODUCING BRAKE DISC, AND BRAKE DISC

(75) Inventors: Jae Young Lee, Gyeonggi-do (KR); Seong Jin Kim, Gyeonggi-do (KR); Jae Min Han, Gyeonggi-do (KR); Yoon Cheol Kim, Seoul (KR); Hyun Dal Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 287 days.

(21) Appl. No.: 13/547,506

(22) Filed: Jul. 12, 2012

(65) Prior Publication Data
US 2013/0140116 A1   Jun. 6, 2013

(30) Foreign Application Priority Data
Dec. 5, 2011   (KR) .................. 10-2011-0128893

(51) Int. Cl.
*B22D 19/00* (2006.01)
(52) U.S. Cl.
USPC ...................................... 188/218 XL; 164/98
(58) Field of Classification Search
USPC ............................. 188/218 XL; 164/98, 100
See application file for complete search history.

(56) References Cited

U.S. PATENT DOCUMENTS

| | | | |
|---|---|---|---|
| 6,352,141 B1 * | 3/2002 | Wendt ..................... | 188/218 XL |
| 7,594,568 B2 * | 9/2009 | Hanna et al. ............ | 188/218 XL |
| 7,975,750 B2 * | 7/2011 | Dessouki et al. ............. | 164/100 |
| 8,684,149 B2 * | 4/2014 | Mueller .................. | 188/218 XL |
| 8,714,232 B2 * | 5/2014 | Hanna et al. ................... | 164/98 |
| 2011/0266103 A1 * | 11/2011 | Mueller .................. | 188/218 XL |

* cited by examiner

*Primary Examiner* — Christopher Schwartz
(74) *Attorney, Agent, or Firm* — Edwards Wildman Palmer LLP; Peter F. Corless

(57) ABSTRACT

A method for producing a brake disc comprising a coupling part having a centered through-hole, a friction part on the periphery of the coupling part, and a wall part connecting the coupling part and the friction part, including: producing a mold in which the coupling part, the wall part, and the friction part are integrally formed, wherein a gap prevents molten metal from overflowing between the wall part and the coupling part, interface is formed on the periphery of the coupling part, an overflow is provided outside the wall part opposite the gap; a first injection process of injecting a first material to form the friction part; and a second injection process of injecting a second material to form the coupling part, a mold for producing the brake disc, and the brake disc.

10 Claims, 4 Drawing Sheets

METHOD FOR PRODUCING BRAKE DISC, MOLD FOR PRODUCING BRAKE DISC, AND BRAKE DISC

CROSS-REFERENCE TO RELATED APPLICATION

This application claims under 35 U.S.C. §119(a) the benefit of Korean Patent Application No. 10-2011-0128893 filed on Dec. 5, 2011, the entire contents of which are incorporated herein by reference.

BACKGROUND (a) Technical Field

The present invention relates to a method for producing a brake disc, particularly a method for producing a brake disc by casting gray cast iron and ductile cast iron, an apparatus for producing a brake disc, and a brake disc produced thereby. The present method saves costs and provides a lightweight brake disc.

(b) Background Art

Worldwide automobile companies concentrate significant efforts on technological developments for improving fuel efficiency due to limited petroleum energy resources and its impact on the environment and climatic change. Among the technological developments aimed towards improving fuel efficiency, decreasing vehicle weight without performance deterioration attracts public attention.

In particular, a weight reduction in a lower part of the vehicle directly influences the performance and fuel efficiency of the vehicle. Since a decrease of an unsprung mass (i.e. the mass of the suspension, wheels, and other components directly connected to them, rather than supported by the suspension) associated directly with a wheel driving load greatly improves fuel efficiency, associated technologies have been very rapidly advanced in recent years.

Among these technologies, much attention has been focused towards the development of a method that reduces the weight of a brake disc, which occupies a primary weight of the unsprung mass, without deteriorating performance.

In a brake disc 10 in the related art, as shown in FIG. 1, both a hat part 30 to be mounted on a hub and a disc plate 20 where friction is made while braking are manufactured by an organization of flake graphite which forms gray cast iron. This provides excellent braking characteristics such as a vibration reducing capacity, a damping capacity, a heat dissipating capacity, and a lubricating function.

However, such a brake disc is heavy due to the specific gravity of gray cast iron, which is equivalent to 7.2 g/cm$^3$. This heavy weight is a primary factor that causes a deterioration in the fuel efficiency.

Therefore, a brake disc using a heterogeneous material needs to be developed in order to reduce the weight of the brake disc. Further, the disc structure must satisfy performance requirements, such as the heat dissipating capacity or deformation resistance, while providing durability by perfectly coupling two heterogeneous materials.

The existing technology configures the brake by coupling a hub, made of heat treatment forging steel, to a disc, made of a single material such as gray cast iron. However, the parts much be coupled, which results in an unnecessary weight increase, can further result in an inadequate coupling force between the parts, and provides for more a more complex assembly process.

Matters described as the background art are just to improve the background of the present invention, but it should not be understood that the matters correspond to the related art which has been already known to those skilled in the art.

SUMMARY OF THE DISCLOSURE

The present invention has been made in an effort to provide an improved brake disc and a method for its production. According to various embodiments, the method eliminates a hub part conventionally included in a brake disc, and selectively gravity-casts materials used for forming each part of the brake disc in succession during the same cast process. More particularly, gray cast iron and ductile graphite cast iron are selectively gravity-cast in succession during the same cast process to distinguish the parts according to the necessity of rigidity. That is, a material required in each part of the brake disc is used, wherein the parts are stably casted to be configured into one article to decrease an unnecessary weight and increase coupling force between the parts, and to further simplify the assembly. The present invention further provides a mold for producing a brake disc.

An exemplary embodiment of the present invention provides a method for producing a brake disc which comprises a coupling part having a through-hole at the center thereof, a friction part formed on the periphery of the coupling part, and a wall part connecting the coupling part and the friction part. According on one aspect, the method comprises: a mold forming process for producing a mold in which the coupling part, the wall part, and the friction part are integrally formed, which includes forming a gap for preventing molten metal from being overflown between the wall part forming portion and the coupling part forming portion and for forming an interface on the periphery of the coupling part with a predetermined depth, and forming an overflow having a predetermined area outside the wall part forming portion opposite to the gap; a first injection process of injecting a first material into an inlet of the friction part forming portion such that the injected first material is prevented from flowing over the gap; and a second injection process of injecting a second material into an inlet of the coupling part forming portion after the first injection process.

According to various embodiments, in the mold forming process, the overflow may be formed at the inlet side of the friction part forming portion outside the wall part forming portion, and the overflow may be formed to have a thickness not to flow over the gap (i.e. the thickness of the overflow is such that the height of the gap is greater than or equal to that of the overflow, such as shown in FIG. 5).

According to various embodiments, in the mold forming process, the inlets of the friction part forming portion and the coupling part forming portion may be formed so that injection directions of the first material and the second material are substantially parallel to each other. In the first injection process, the first material may be injected until the first material is positioned at the center of the overflow.

In the second injection process, the second material may be injected after injection of the first material, and preferably is injected at the time when the interface of the first material starts coagulating after the first injection process.

When the first material starts coagulating, the temperature of the interface may be in the range of about −50 to +10° C. as compared with the temperature of a solidus line made of the first material.

In the second injection process, the second material may first be melted by increasing the temperature to about 1450 to 1700° C. followed by injection.

According to embodiments, the first and second materials are selected from various types of cast iron, preferably wherein the first material may be gray cast iron and the second material may be ductile graphite cast iron.

According to another aspect, a mold for producing a brake disc which comprises a coupling part having a through-hole at the center thereof, a friction part formed on the periphery of the coupling part, and a wall part connecting the coupling part and the friction part is provided. The mold is configured such that, while the coupling part, the wall part, and the friction part are integrally formed, (a) a gap is provided for preventing molten metal from overflowing between the wall part forming portion and the coupling part forming portion, and such that an interface is formed on the periphery of the coupling part (particularly between the coupling part and the wall part) with a predetermined depth, and (b) an overflow having a predetermined area is formed outside the wall part forming portion opposite to the gap.

According to a further aspect, a brake disc is provided which comprises a coupling part having a through-hole at the center thereof, a friction part formed on the periphery of the coupling part, and a wall part connecting the coupling part and the friction part, wherein the coupling part and the wall part are integrated, and wherein a gap is provided between the wall part and the coupling part. According to various embodiments, an interface is provided on the periphery of the coupling part with a predetermined depth. According to various embodiments, the coupling part and the friction part are made of different materials, and when the interface between both materials contact each other is formed, an intermediate phase is not formed on the interface.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
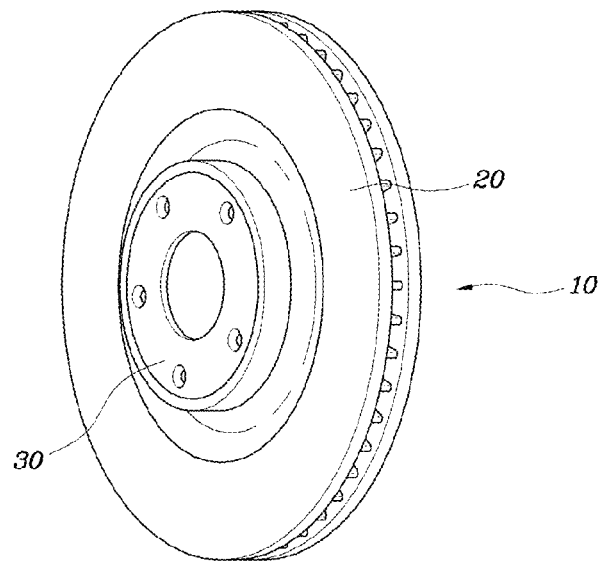
FIG. 1 is a perspective view of a brake disc made of a single material in the related art.

It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DETAILED DESCRIPTION

Hereinafter, a brake disc, a method for producing a brake disc, and a mold for producing a brake disc according to exemplary embodiments of the present invention will be described with reference to the accompanying drawings.

Figure 2:
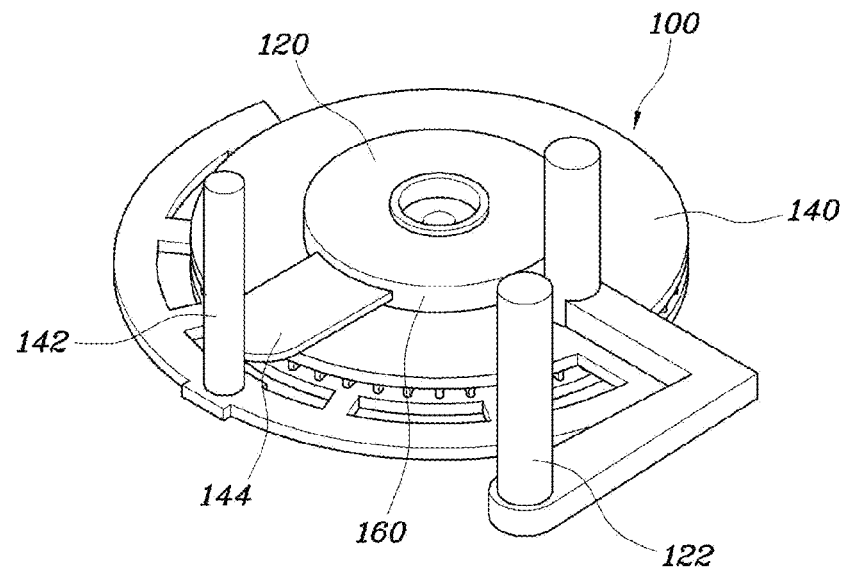
FIG. 2 is a perspective view of a mold of a method for producing a brake disc according to an exemplary embodiment of the present invention.
Figure 3:
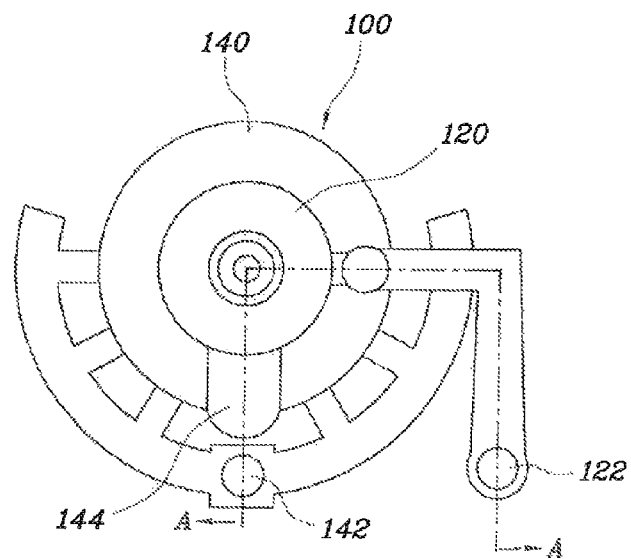
FIG. 3 is a plan view of the mold shown in FIG. 2.
Figure 4:
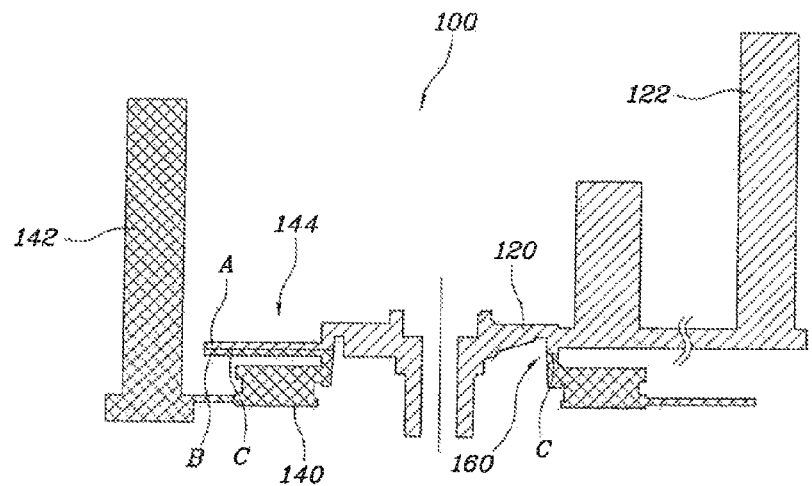
FIG. 4 is a cross-sectional view taken along line A-A of the mold shown in FIG. 3.
Figure 5:
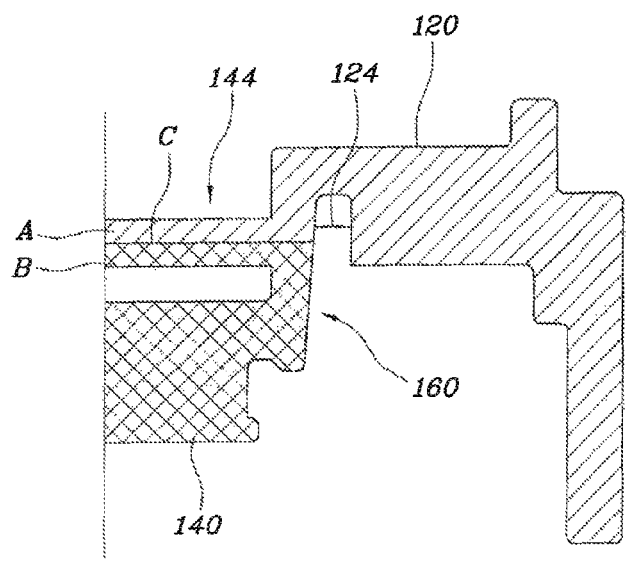
FIG. 5 is a diagram showing a primary part of the mold shown in FIG. 4.

FIG. 2 is a perspective view of a mold used in a method for producing a brake disc according to an exemplary embodiment of the present invention. FIG. 3 is a plan view of the mold shown in FIG. 2. FIG. 4 is a cross-sectional view taken along line A-A of the mold shown in FIG. 3. FIG. 5 is a diagram showing a primary part of the mold shown in FIG. 4.

Currently, brakes are configured by coupling a hub made of heat treated forged steel to a disc made of a single material, such as gray cast iron. On the other hand, according to the present invention, the hub part is eliminated, and gray cast iron and ductile graphite cast iron are selectively gravity-casted in succession during the same cast process to distinguish the parts according to the necessity of rigidity. Unlike an existing disc casting mold and method, the present invention uses gravity horizontal casting with a horizontal shaping method to produce the brake disc. In particular, according to embodiments of the present invention, a friction part forming portion is positioned in a lower part of the mold and gravity casting is carried out in order to form a coupling part constituted by a hub and a hat and the friction part.

According to various embodiments, the friction part is made of gray cast iron ("FC") in order to provide braking force and heat dissipating capacity similar to that of the existing brake disc, and an integrated coupling part is made of ductile graphite cast iron ("FCD") for maintaining rotational torque and fracturing rigidity. The friction part made of gray cast iron is formed by injecting FC based molten gray cast iron into a mold (e.g. a mold prepared in green type or $CO^2$ type and other type molds), followed by injection of molten FCD cast iron which has either been previously subjected to spheroidizing reaction or which is spheroidized while being injected into the mold at a temperature in the range of about 1000 to 1200° C.

In this case, a friction interface does not form a gradient intermediate phase but, rather, is manufactured so that a layer is not separated while configuring a flake/spheric minute organization (since the friction interface does not have a desired material property of FC or FCD but, rather, has an intermediate material property when the friction interface has a gradient intermediate phase, the friction interface is undesirable due to rigidity and other weak material properties). According to various embodiments, secondary molten FCD is further injected at a temperature in the range of about −10 to +10° C. as compared with the temperature of a solidus line of molten FC injected primarily without the interface by adding other non-metallic materials to the interface to suppress the intermediate phase.

A method for producing a brake disc according to an exemplary embodiment of the present invention includes: a mold forming process of producing a mold 100 in which a coupling part 120, a wall part 160, and a friction part 140 are thereby integrally formed, wherein a gap 124 is provided for preventing molten metal from overflowing between the wall part forming portion 160 and the coupling part forming portion 120, wherein an interface C on the periphery of the thus formed coupling part 220 is formed with a predetermined depth, and wherein an overflow 144 having a predetermined area outside the wall part forming portion 160 is formed opposite to the gap 124; a first injection process of injecting a first material into an inlet 142 of the friction part forming portion 140, wherein the injected first material is prevented from flowing over the gap 124; and a second injection process of injecting a second material into an inlet 122 of the coupling part forming portion 120 after the first injection process is completed. As used herein, reference to "the friction part, the coupling part, and the wall part" as the components of the formed brake disc which is a casted product are also used to describe the respective portions of the mold which form these parts (with the corresponding portions of the mold being generally referred to as "the friction part forming portion, the coupling part forming portion, and the wall part forming portion").

In the exemplary embodiment of the present invention, when molten metal made of different materials is injected into the friction part forming portion 140 and the coupling part forming portion 120 of the mold to be casted, the gap 124 is formed for preventing the molten metal from overflowing between the wall part forming portion 160 and the coupling part forming portion 120, and the interface C is formed on the periphery of the formed coupling part 220 with the predetermined depth to securely form the interface between both materials in the wall part 260. As such, the thus formed friction part 240 and the coupling part 220 may be formed so as to possess certainly different properties.

Further, an overflow 144 having a predetermined area is formed outside the wall part forming portion 160 opposite to the gap 124 at the inlet 142 side of the friction part forming portion 140. The overflow 144 is provided with a thickness not to flow over the gap 124. The height of the thus formed wall part 260 can be effectively decreased through the structures of the overflow 144 and the gap 124 to thereby reduce the mass of the brake disc.

Meanwhile, in the mold forming process, the inlets 122 and 142 of the friction part forming portion 140 and the coupling part forming portion 120 are formed so that injection directions of the first material and the second material are both vertical, and can be parallel to each other, such that gravity casting can be achieved better.

According to various embodiments, the first material is injected in the first injection process until the first material is positioned at about the center of the overflow 144, and then the second material is injected in the second injection process at the time when the interface of the first material starts coagulating. As shown in FIG. 5, both materials A and B form the interface C even in the overflow 144.

According to an exemplary embodiment, the first material starts coagulating when the temperature of the interface is in the range of about −50 to +10° C. as compared with the temperature of a solidus line made of the first material. Further, in the second injection process, the second material is first melted by increasing the temperature to about 1450 to 1700° C., and thereafter is injected to sufficiently spheroidize the second material. According to this method, no intermediate phase is generated between the first material and the second material, thereby increasing rigidity of a coupled part.

According to various embodiments, the first material is made of gray cast iron to increase friction, while the second material is made of ductile graphite cast iron to increase the rigidity.

According to various embodiments, in the mold 100 (as shown in FIGS. 2 to 5) used in the production method, while the coupling part forming portion 120, the wall part forming portion 160, and the friction part forming portion 140 are integrated, a gap 124 is provided for preventing molten metal from overflowing between the wall part forming portion 160 and the coupling part forming portion 120 and for forming the interface C on the periphery of the thus formed coupling part 220 in a groove shape with a predetermined depth, and an overflow 144 having a predetermined area is provided outside the wall part forming portion 160 opposite to the gap 124.

The brake disc produced by the above production method and mold comprises a coupling part 220 with the through-hole at the center thereof, a friction part 240 formed on the periphery of the coupling part 220, and a wall part 260 connecting the coupling part 220 and the friction part 240, wherein the coupling part 220, the wall part 260, and the friction part 240 are integrally formed. As shown, a gap 224 is further provided in the brake disc where molten metal has been prevented from overflowing between the wall part forming portion 160 and the coupling part forming portion 120 and for forming the interface C on the periphery of the coupling part 220 with a predetermined depth. According to various embodiments, the coupling part 220 and the friction part 240 are made of different materials, and the interface between both materials does not include an intermediate phase.

Figure 6:
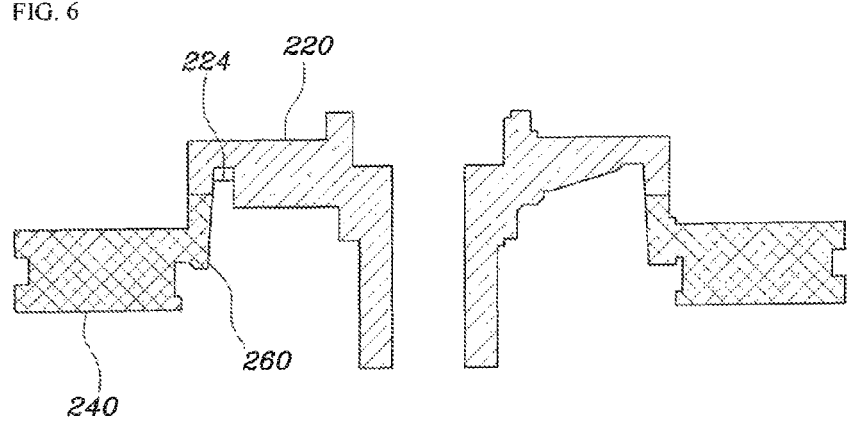
FIG. 6 is a cross-sectional view of a brake disc formed according to an exemplary embodiment of the present invention.

FIG. 6 is a cross-sectional view of a brake disc according to an exemplary embodiment of the present invention, which includes a friction part 240, a coupling part 120, a wall part 260 and a gap 224. The detailed shape of the brake disc and its various components corresponds with those of the mold, and, thus, the reference numerals and respective parts will not be described in further detail.

Figure 7:
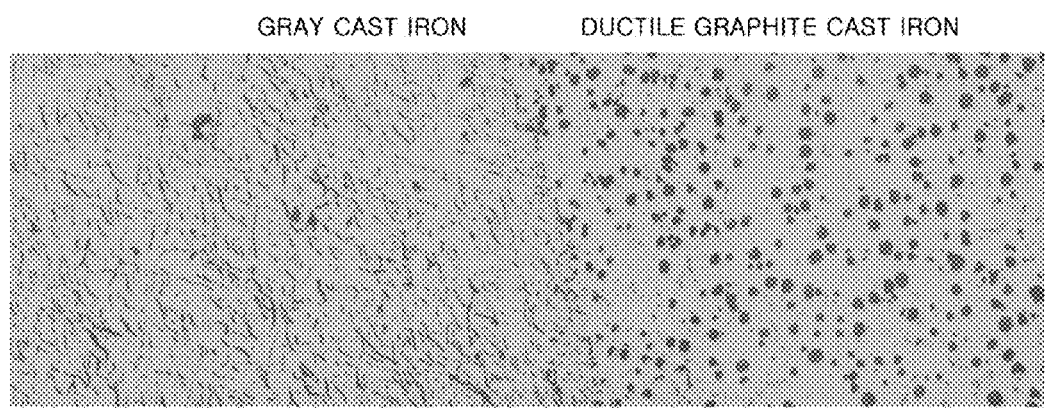
FIG. 7 is a diagram showing a boundary between gray cast iron and ductile graphite cast iron of the brake disc shown in FIG. 6.

Meanwhile, FIG. 7 is a diagram showing a boundary between gray cast iron and ductile graphite cast iron of the brake disc produced according to an exemplary embodiment as shown in FIG. 6. As shown, an intermediate phase is not formed on the boundary between the gray cast iron and the ductile graphite cast iron, and as a result, the brake disc is produced so that intercoupling force on a coupling surface is not deteriorated.

According to a method for producing a brake disc, a mold for producing a brake disc, and the brake disc according to exemplary embodiments of the present invention, a brake disk is provided without a hub part and gray cast iron and ductile graphite cast iron are selectively gravity-casted in succession during the same cast process to distinguish the parts according to the necessary rigidity.

Further, according to the present invention a material required in each part of the brake disc is used, however, the parts are stably casted to form one article in a simplified assembly process wherein unnecessary weight is decreased and coupling force between the parts is increased, thereby providing an improved brake disc.

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

What is claimed is:

1. A method for producing a brake disc comprising a coupling part having a through-hole at the center thereof, a friction part formed on a periphery of the coupling part, and a wall part connecting the coupling part and the friction part, the method comprising:

a mold forming process of producing a mold in which the coupling part, the wall part, and the friction part are integrally formed, the mold including a coupling part forming portion, a wall part forming portion, and a friction part forming portion, an inlet to the friction part forming portion, an inlet to a coupling part forming portion, a gap is disposed between a wall part forming portion and the coupling part forming portion for preventing molten metal from overflowing between the wall part forming portion and the coupling part forming portion and for forming an interface on the periphery of the coupling part with a predetermined depth, and an overflow having a predetermined area provided outside the wall part forming portion opposite to the gap;

a first injection process of injecting a first material into the inlet of the friction part forming portion, the first material injected so as to prevent the injected first material from flowing over the gap; and a second injection process of injecting a second material into the inlet of the coupling part forming portion after the first injection process.

2. The method for producing a brake disc of claim 1, wherein in the mold forming process, the overflow is formed at the inlet side of the friction part forming portion outside the wall part forming portion, and the overflow is formed having a thickness less than a height of the gap.

3. The method for producing a brake disc of claim 1, wherein in the mold forming process, the inlets of the friction part forming portion and the coupling part forming portion are formed so that injection directions of the first material and the second material are vertical.

4. The method for producing a brake disc of claim 1, wherein in the mold forming process, injection directions of the first material and the second material are parallel to each other.

5. The method for producing a brake disc of claim 1, wherein in the first injection process, the first material is injected until the first material is positioned at a center of the overflow.

6. The method for producing a brake disc of claim 1, wherein in the second injection process, the second material is injected at a time when an interface of the first material starts coagulating.

7. The method for producing a brake disc of claim 6, wherein at the time when the first material starts coagulating, the temperature of the interface is in the range of about −50 to +10° C. as compared with a temperature of a solidus line made of the first material.

8. The method for producing a brake disc of claim 1, wherein in the second injection process, the second material is first melted by increasing the temperature to about 1450 to 1700° C. and thereafter, the second material injected.

9. The method for producing a brake disc of claim 1, wherein the first material is made of gray cast iron and the second material is made of ductile graphite cast iron.

10. A mold for producing a brake disc, comprising:

a coupling part forming section for forming a coupling part having a through-hole at the center thereof;

a friction part forming portion on a periphery of the coupling part forming portion;

a wall part forming portion connecting the coupling part forming portion and the friction part forming portion, wherein while the coupling part forming portion, the wall part forming portion, and the friction part forming portion are integrated;

a gap disposed between the wall part forming portion and the coupling part forming portion so as to prevent overflow of molten metal between the wall part forming portion and the coupling part forming portion; and an overflow having a predetermined area disposed outside the wall part forming portion opposite to the gap.

* * * * *